United States Patent
Shen et al.

(10) Patent No.: US 10,623,822 B2
(45) Date of Patent: Apr. 14, 2020

(54) VIRTUAL CABLE MODEM TERMINATION SYSTEM REDUNDANCY

(71) Applicant: Cisco Technology, Inc., San Jose, CA (US)

(72) Inventors: Xiaowei Shen, Shanghai (CN); Yuliang Chen, Shanghai (CN); Jian Chen, Shanghai (CN); Yu-Chan Lo, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 15/788,837

(22) Filed: Oct. 20, 2017

(65) Prior Publication Data
US 2019/0124407 A1    Apr. 25, 2019

(51) Int. Cl.
| H04N 21/647 | (2011.01) |
| H04N 21/61 | (2011.01) |
| H04N 21/6338 | (2011.01) |
| H04L 12/28 | (2006.01) |

(52) U.S. Cl.
CPC ... *H04N 21/64707* (2013.01); *H04L 12/2801* (2013.01); *H04N 21/615* (2013.01); *H04N 21/6118* (2013.01); *H04N 21/6338* (2013.01)

(58) Field of Classification Search
CPC .............. G06F 9/455; G06F 9/45558; G06F 2009/45562; G06F 2009/4557; H04L 12/2801; H04L 12/4633; H04N 21/64707; H04N 21/6118; H04N 21/615; H04N 21/6338

See application file for complete search history.

(56) References Cited

U.S. PATENT DOCUMENTS

| 7,688,828 | B2 | 3/2010 | Chapman et al. |
| 9,258,237 | B1 | 2/2016 | Smith et al. |
| 9,430,262 | B1 * | 8/2016 | Felstaine ............. G06F 9/45558 |
| 9,467,381 | B2 | 10/2016 | Frieh et al. |
| 9,641,354 | B2 | 5/2017 | Bernstein et al. |
| 2015/0092531 | A1 * | 4/2015 | Bernstein ............ H04L 41/0672 370/216 |
| 2016/0328251 | A1 | 11/2016 | Bernstein et al. |

* cited by examiner

*Primary Examiner* — Wing F Chan
*Assistant Examiner* — Billy H Ng
(74) *Attorney, Agent, or Firm* — Merchant & Gould P.C.

(57) ABSTRACT

Virtual cable modem termination system redundancy may be provided. First, a new virtual cable modem termination system (vCMTS) instance may be spawned. Then a backhaul connection between the new vCMTS instance and a data center network may be created. Next, a database connection between the new vCMTS instance and a database may be created. Upstream and downstream traffic of a node may then be switched from an active vCMTS instance to the new vCMTS instance.

20 Claims, 3 Drawing Sheets

VIRTUAL CABLE MODEM TERMINATION SYSTEM REDUNDANCY

TECHNICAL FIELD

The present disclosure relates generally to virtual cable modem termination system redundancy.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
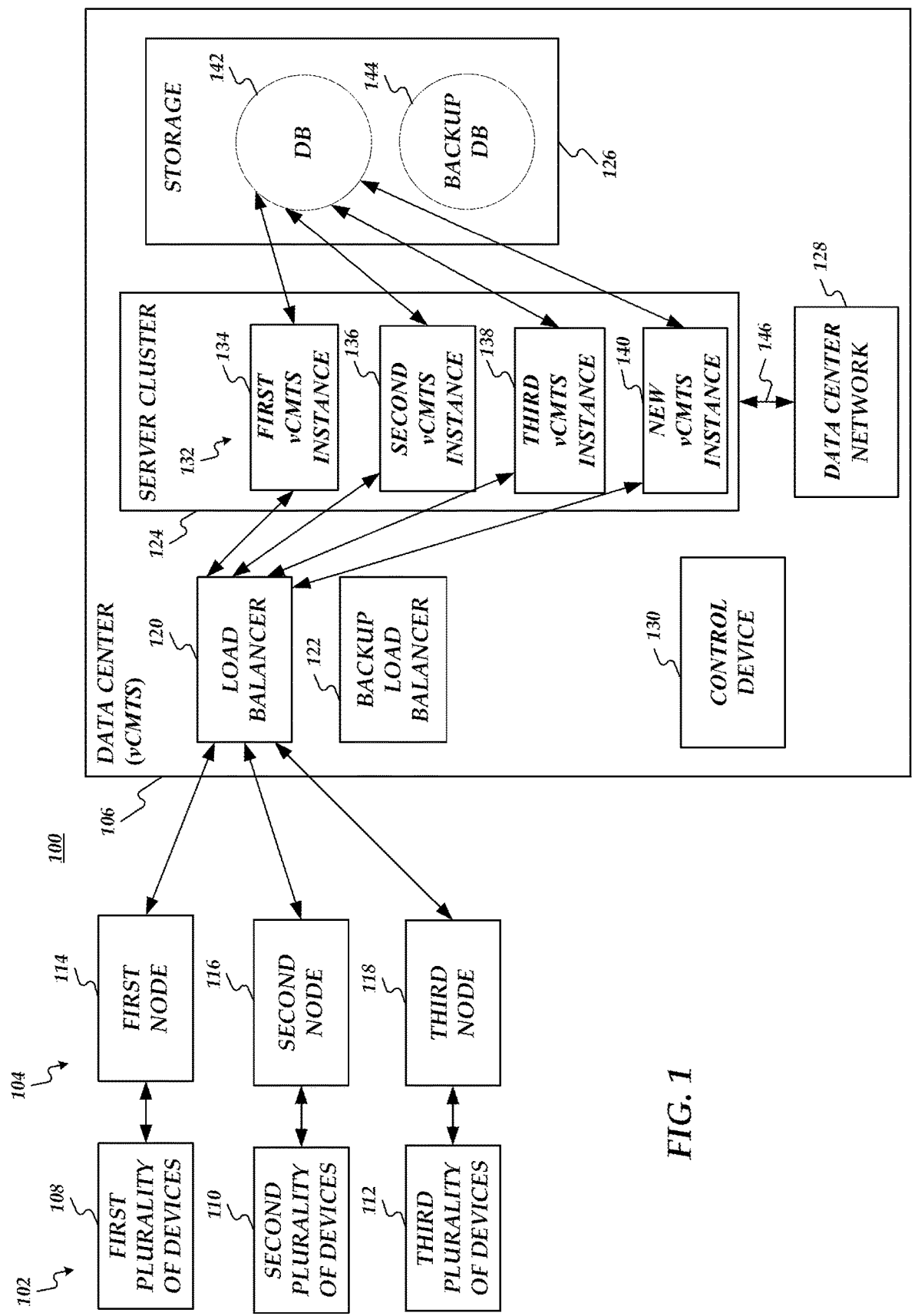
FIG. 1 is a block diagram of a virtual cable modem termination system.

Virtual cable modem termination system redundancy may be provided. First, a new virtual cable modem termination system (vCMTS) instance may be spawned. Then a backhaul connection between the new vCMTS instance and a data center network may be created. Next, a database connection between the new vCMTS instance and a database may be created. Upstream and downstream traffic of a node may then be switched from an active vCMTS instance to the new vCMTS instance.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

A cable modem termination system (CMTS) may comprise a device located in a service provider's (e.g., a cable company's) headend that may be used to provide high speed data services, such as cable Internet or Voice-Over-Internet Protocol, to subscribers. Remote physical layer (i.e., RPHY) may comprise shifting or distributing the physical layer (i.e., PHY) of a conventional cable headend CMTS to fiber nodes (e.g., RPHY nodes) in a network. Consistent with embodiments of the disclosure, a virtual Cable Modem Termination System (vCMTS) may utilize a number of vCMTS instances within the CMTS in a data center. Embodiments of the disclosure may treat the number of vCMTS instances in the datacenter as one large vCMTS where RPHY nodes may communicate with this one large vCMTS via a load balancer (e.g., the load balancer may comprise a cluster). This large vCMTS may have an active database to store state or data. Added or removed vCMTS instance in the one large vCMTS may not be aware of devices (e.g., cable modems (CMs) and RPHY nodes) connected to the load balancer.

FIG. 1 is a block diagram of a system 100 for providing virtual cable modem termination system redundancy. As shown in FIG. 1, system 100 may comprise a plurality of devices 102, a plurality of nodes 104, and a data center 106. A vCMTS may be instantiated by data center 106. Plurality of devices 102 may comprise a first plurality of devices 108, a second plurality of devices 110, and a third plurality of devices 112. Ones of first plurality of devices 108, second plurality of devices 110, and third plurality of devices 112 may comprise, but are not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device.

Plurality of nodes 104 may comprise a first node 114, a second node 116, and a third node 118. Plurality of nodes 104 may comprise RPHY nodes where the physical layer (i.e., PHY) of a conventional cable headend CMTS may be shifted to fiber nodes (e.g., RPHY nodes) in the network comprising plurality of nodes 104. As shown in FIG. 1, first plurality of devices 108 may be connected to and served by first node 114, second plurality of devices 110 may be connected to and served by second node 116, and third plurality of devices 112 may be connected to and served by third node 118.

Data center 106 may comprise a load balancer 120, a backup load balancer 122, a service cluster 124, a storage 126, a data center network 128, and a control device 130. Backup load balancer 122 may be used in the place of load balance 120 should load balance 120 fail. Load balancer 120 and backup load balancer 122 may each comprise a cluster where the cluster, for example, may be used when traffic from plurality of nodes 104 is heavy. Data center network 128 may provide, for example, a gateway to the Internet. Load balancer 120 and control device 130, individually or in combination, may implement, for example, the stages of method 200 for providing virtual cable modem termination system redundancy as described in more detail below with respect to FIG. 2. Load balancer 120, backup load balancer 122, service cluster 124, storage 126, and control device 130, for example, may each be implemented using a computing device 300 as described in greater detail below with respect to FIG. 3.

Service cluster 124 may comprise a plurality of vCMTS instances 132. Plurality of vCMTS instances 132 may comprise, for example, a first vCMTS instance 134, a second vCMTS instance 136, a third vCMTS instance 138, and a new vCMTS instance 140. Plurality of vCMTS instances 132 may comprise any number of vCMTS instance and is not limited to the aforementioned. Any one of first vCMTS instance 134, second vCMTS instance 136, and third vCMTS instance 138 may comprise an active vCMTS instance. Plurality of vCMTS instances 132 may each comprise a software module that taken as a whole may provide the functionality of the vCMTS instantiated by data center 106. Plurality of vCMTS instances 132 may reside on the same server (i.e., service cluster 124) or may reside on different servers or in different data centers.

Ones of plurality of vCMTS instances 132 may be spawned or deactivated based, for example, based upon the needs of the vCMTS. Storage 126 may comprise a data base 142 and a backup data base 144. Backup data base 144 may be used in the place of data base 142 should data base 142 fail. Backhaul connection 146 may connect ones of plurality of vCMTS instances 132 to data center network 128.

Load balancer 120 may be involved in switching and translating traffic exchanged between plurality of vCMTS instances 132 and plurality of devices 102. Plurality of devices 102 may be isolated from plurality of vCMTS instances 132 and may interact with load balancer 120. Embodiments of the disclosure may utilize several different forwarding protocol types that load balancer 120 may support. These protocols may comprise, but are not limited to, network address translation (NAT), direct routing (DR), tunneling, and full NAT. Load balancer 120 may serve as a gateway for data center 106 (i.e., vCMTS) and all traffic may pass through it. Accordingly, with embodiments of the disclosure, load balancer 120 may control inbound (i.e., upstream) traffic and outbound (i.e., downstream) traffic thus ones of plurality of nodes 104 may only need to know the Internet Protocol (IP) address (e.g., virtual IP address) of load balancer 120. If traffic is heavy to and from plurality of nodes 104, load balancer 120 may use DR protocol where load balancer 120 may forward incoming requests to plurality of vCMTS instances 132 comprising the vCMTS, but plurality of vCMTS instances 132 inside the vCMTS may send their replies directly back to plurality of nodes 104.

Figure 2:
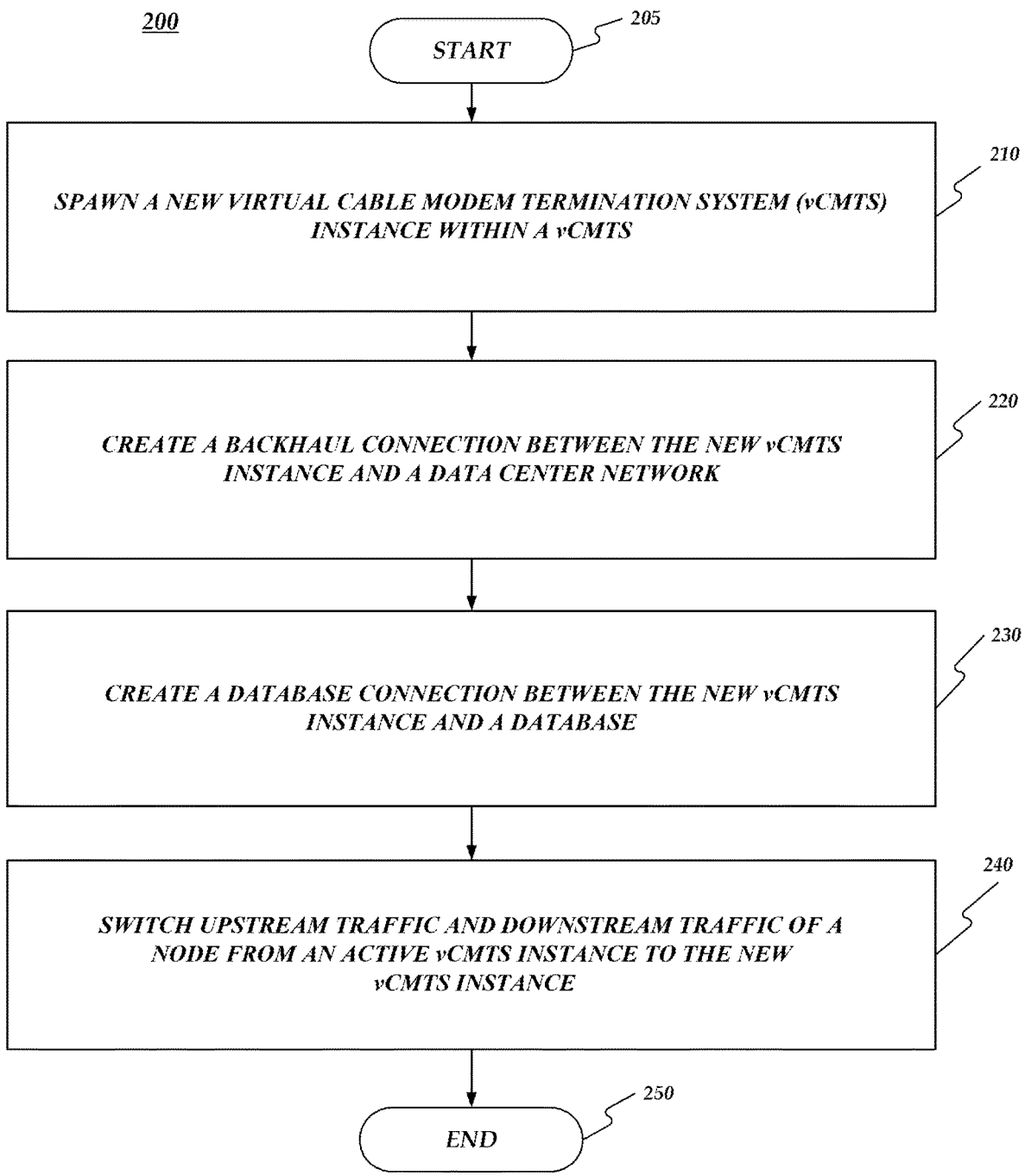
FIG. 2 is a flow chart of a method for providing virtual cable modem termination system redundancy.

FIG. 2 is a flow chart setting forth the general stages involved in a method 200 consistent with an embodiment of the disclosure for providing virtual cable modem termination system redundancy. Method 200 may be implemented using a computing device 300 as described in more detail below with respect to FIG. 3. Ways to implement the stages of method 200 will be described in greater detail below.

Method 200 may begin at starting block 205 and proceed to stage 210 where load balancer 120 or control device 130 may cause server cluster 124 to spawn new virtual cable modem termination system (vCMTS) instance 140. For example, new vCMTS instance 140 may be spawned in response to determining that the active vCMTS instances (e.g., first vCMTS instance 134, second vCMTS instance 136, and third vCMTS instance 138) has failed. In addition, new vCMTS instance 140 may be spawned in response to determining that a load on the vCMTS increased beyond a predetermined level.

Load balancer 120 may be responsible for fault detection and may monitor the vCMTS's service status. The service status may be monitored, for example, by sending a heartbeat message periodically, checking vCMTS's Data Over Cable Service Interface Specification (DOCSIS) MAP message, or checking a session/link status. Normally, orchestration and the vCMTS may be deployed together. Orchestration (e.g., via control device) may also do fault detection and instruct load balancer 120, for example, to install a new NAT table.

From stage 210, where load balancer 120 or control device 130 causes server cluster 124 to spawn new vCMTS instance 140, method 200 may advance to stage 220 where load balancer 120 or control device 130 may create backhaul connection 146 between new vCMTS instance 140 and data center network 128. For example, creating backhaul connection 146 between new vCMTS instance 140 and data center network 128 comprises creating backhaul connection 146 where data cater network 128 may comprise a gateway to the internet.

Once load balancer 120 or control device 130 creates backhaul connection 146 between new vCMTS instance 140 and data center network 128 in stage 220, method 200 may continue to stage 230 where load balancer 120 or control device 130 may create a database connection between new vCMTS instance 140 and database 142. For example, creating the database connection may comprise synchronizing a state of new vCMTS instance 140 with database 142. Consistent with embodiments of the disclosure, plurality of vCMTS instances 132 may share only one database (i.e., database 142) or file system. The state of the vCMTS may be stored in database 140.

After load balancer 120 or control device 130 creates the database connection between new vCMTS instance 140 and database 142 in stage 230, method 200 may proceed to stage 240 where load balancer 120 or control device 130 may switch upstream and downstream traffic of a node from an active vCMTS instance to new vCMTS instance 140. For example, load balancer 120 may keep a table of sessions and make transactions between the vCMTS and plurality of nodes 104 persistent. One form of persistence may comprise recording the source IP address and port number of inbound traffic and which of plurality of vCMTS instances 132 the traffic was load balanced to. Then future transactions may be sent to the same one of the plurality of vCMTS instances 132.

When switching to new vCMTS instance 140, load balancer 120 may know that incoming traffic from a specific one of plurality of nodes 104 should "route" to new vCMTS instance 140 instead of one of the active vCMTS instance because the NAT table was changed for example. In this process, the specific one of plurality of nodes 104 may not be aware of the switching.

The following may comprise a process for switching upstream traffic from one of plurality of nodes 104 to new vCMTS instance 140. Because the one of plurality of nodes 104 may not know what is happened inside data center 106, the one of plurality of nodes 104 may continue to send upstream traffic with a pervious destination IP address (e.g., the virtual IP address of the vCMTS). Once the upstream traffic reaches load balancer 120, load balancer 120 may perform a look up to a NAT table, replace the destination IP address and port number with new vCMTS instance 140's IP address and port number, and then forward the upstream traffic to new vCMTS instance 140. New vCMTS instance 140 may receive and process the upstream traffic.

The following may comprise a process for switching downstream traffic from new vCMTS instance 140 to one of plurality of nodes 104. First, new vCMTS instance 140 may start to send downstream traffic to one of plurality of nodes 104 with the IP address and port number of one of plurality of nodes 104 as destination. From database 142, new vCMTS instance 140 may know which one of plurality of nodes 104 it will start serving that was previously server by the active vCMTS instance switched from. Then, when the downstream traffic reaches load balancer 120, load balancer 120 may perform a lookup in the NAT table, replace the source IP address and port number with the virtual IP address VIP and port of the vCMTS, and then forward the downstream traffic to the one of plurality of nodes 104. The one of plurality of nodes 104 may receive and process the downstream traffic and it may not be aware that the switching took place. Once load balancer 120 or control device 130 switches upstream and downstream traffic of the node from the active vCMTS instance to new vCMTS instance 140 in stage 240, method 200 may then end at stage 250.

Figure 3:
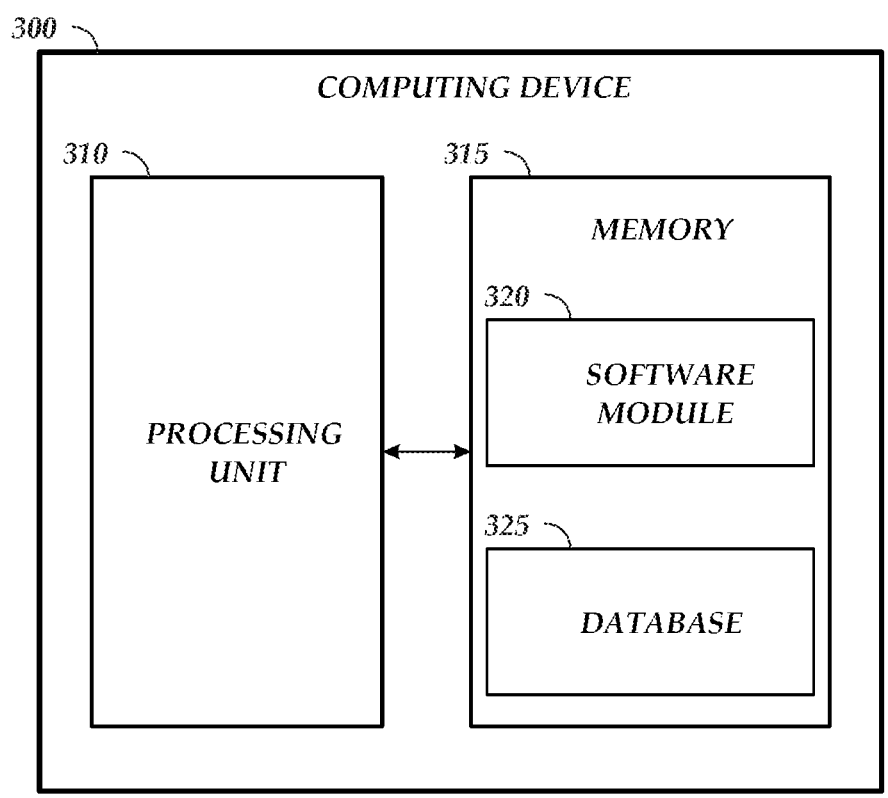
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing virtual cable modem termination system redundancy, including for example, any one or more of the stages from method 200 described above with respect to FIG. 2. Computing device 300, for example, may provide an operating environment for load balancer 120, control device 130, or server cluster 124. Load balancer 120, control device 130, or server cluster 124 may operate in other environments and are not limited to computing device 300.

Computing device 300 may be implemented using a personal computer, a network computer, a mainframe, a router, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
spawning a new virtual Cable Modem Termination System (vCMTS) instance within a vCMTS;
creating a backhaul connection between the new vCMTS instance and a data center network;
creating a database connection between the new vCMTS instance and a database; and
switching upstream traffic and downstream traffic of a node from an active vCMTS instance to the new vCMTS instance, wherein switching the upstream traffic and the downstream traffic comprises:
replacing a destination address and a destination port number in the upstream traffic to the destination address and the destination port number associated with the new vCMTS instance from the destination address and the destination port number associated the active vCTMS instance; and
replacing a source address and a source port number in the downstream traffic to the source address and the source port number associated with the active vCMTS instance from the source address and the source port number associated with the new vCMTS instance.

2. The method of claim 1, wherein spawning the new vCMTS instance comprises spawning the new vCMTS instance in response to determining that the active vCMTS instance has failed.

3. The method of claim 1, wherein spawning the new vCMTS instance comprises spawning the new vCMTS instance in response to determining a load increase on the vCMTS.

4. The method of claim 1, wherein the backhaul connection between the new vCMTS instance and the data center network comprises a gateway to the internet.

5. The method of claim 1, wherein creating the database connection further comprises synchronizing a state of the new vCMTS instance with the database.

6. The method of claim 1, wherein the node comprises a Remote Physical Layer (RPHY) node.

7. The method of claim 1, wherein switching the upstream traffic and the downstream traffic comprises switching the upstream traffic and the downstream traffic at a load balancer.

8. A system comprising:
a memory storage; and
a processor coupled to the memory storage, wherein the unit processor is operative to:
spawn a new virtual Cable Modem Termination System (vCMTS) instance within a vCMTS;
create a backhaul connection between the new vCMTS instance and a data center network;
create a database connection between the new vCMTS instance and a database; and
switch upstream traffic and downstream traffic of a node from an active vCMTS instance to the new vCMTS instance, wherein the processor being operative to switch the upstream traffic and the downstream traffic comprises the processor being operative to:
replace a destination address and a destination port number in the upstream traffic to the destination address and the destination port number associated with the new vCMTS instance from the destination address and the destination port number associated the active vCTMS instance, and
replace a source address and a source port number in the downstream traffic to the source address and the source port number associated with the active vCMTS instance from the source address and the source port number associated with the new vCMTS instance.

9. The system of claim 8, wherein the processor being operative to spawn the new vCMTS instance comprises the processor being operative to spawn the new vCMTS instance in response to determining that the active vCMTS instance has failed.

10. The system of claim 8, wherein the processor being operative to spawn the new vCMTS instance comprises the processor being operative to spawn the new vCMTS instance in response to determining a load increase on the vCMTS.

11. The system of claim 8, wherein the data center network comprises a gateway to the internet.

12. The system of claim 8, wherein the processor being operative to create the database connection further comprises the processor being operative to synchronize a state of the new vCMTS instance with the database.

13. The system of claim 8, wherein the node comprises a Remote Physical Layer (RPHY) node.

14. A non-transitory computer-readable medium that stores a set of instructions which when executed perform a method executed by the set of instructions comprising:
spawning a new virtual Cable Modem Termination System (vCMTS) instance within a vCMTS;
creating a backhaul connection between the new vCMTS instance and a data center network;
creating a database connection between the new vCMTS instance and a database; and
switching upstream traffic and downstream traffic of a node from an active vCMTS instance to the new vCMTS instance, wherein switching the upstream traffic and the downstream traffic comprises:
replacing a destination address and a destination port number in the upstream traffic to the destination address and the destination port number associated with the new vCMTS instance from the destination address and the destination port number associated the active vCTMS instance, and
replacing a source address and a source port number in the downstream traffic to the source address and the source port number associated with the active vCMTS instance from the source address and the source port number associated with the new vCMTS instance.

15. The non-transitory computer-readable medium of claim 14, wherein spawning the new vCMTS instance comprises spawning the new vCMTS instance in response to determining that the active vCMTS instance has failed.

16. The non-transitory computer-readable medium of claim 14, wherein spawning the new vCMTS instance comprises spawning the new vCMTS instance in response to determining a load increase on the vCMTS.

17. The non-transitory computer-readable medium of claim 14, wherein the backhaul connection between the new vCMTS instance and the data center network comprises a gateway to the internet.

18. The non-transitory computer-readable medium of claim 14, wherein creating the database connection further comprises synchronizing a state of the new vCMTS instance with the database.

19. The non-transitory computer-readable medium of claim 14, wherein the node comprises a Remote Physical Layer (RPHY) node.

20. The non-transitory computer-readable medium of claim 14, wherein switching the upstream traffic and the downstream traffic comprises switching the upstream traffic and the downstream traffic at a load balancer.

* * * * *